(12) United States Patent
Huang et al.

(10) Patent No.: US 12,334,582 B2
(45) Date of Patent: Jun. 17, 2025

(54) UPPER COVER ASSEMBLY AND BATTERY PACK

(71) Applicant: CONTEMPORARY AMPEREX TECHNOLOGY (HONG KONG) LIMITED, Hong Kong (CN)

(72) Inventors: Haihua Huang, Ningde (CN); Zequan Lu, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 504 days.

(21) Appl. No.: 17/504,295

(22) Filed: Oct. 18, 2021

(65) Prior Publication Data

US 2022/0052414 A1 Feb. 17, 2022

Related U.S. Application Data

(63) Continuation of application No. PCT/CN2019/089320, filed on May 30, 2019.

(30) Foreign Application Priority Data

Apr. 23, 2019 (CN) .......................... 201920555844.0

(51) Int. Cl.
*H01M 50/358* (2021.01)
*H01M 50/204* (2021.01)
*H01M 50/271* (2021.01)

(52) U.S. Cl.
CPC ....... *H01M 50/358* (2021.01); *H01M 50/204* (2021.01); *H01M 50/271* (2021.01)

(58) Field of Classification Search
None
See application file for complete search history.

(56) References Cited

U.S. PATENT DOCUMENTS 4,053,683 A * 10/1977 Rounds ................. H01M 10/52
429/71
10,141,554 B2 11/2018 Khandelwal
(Continued)

FOREIGN PATENT DOCUMENTS

CN 102842689 A 12/2012
CN 103311465 * 1/2013 .............. H01M 2/08
(Continued)

OTHER PUBLICATIONS

Contemporary Amperex Technology Co., Limited, Extended European Search Report, EP19925935.9, Aug. 10, 2022, 8 pgs.
(Continued)

*Primary Examiner* — Amanda J Barrow

(57) ABSTRACT

This application relates to the technical field of energy storage devices, and in particular, to an upper cover assembly and a battery pack. The upper cover assembly includes: an upper cover body, including a top plate and a side plate connected to an outer periphery of the top plate, wherein an exhaust vent is provided in the side plate; and an exhaust unit, including a first exhaust unit and a second exhaust unit that communicates with each other, wherein the first exhaust unit is disposed on the top plate, the second exhaust unit is disposed on the side plate, and the first exhaust unit communicates with the exhaust vent through the second exhaust unit. The upper cover assembly provided in this application allows gas (in battery cells) to be quickly discharged from the first exhaust unit and the second exhaust unit to the exhaust vent.

5 Claims, 6 Drawing Sheets

(56) References Cited

U.S. PATENT DOCUMENTS

| | | | |
|---|---|---|---|
| 2001/0026887 A1* | 10/2001 | Minamiura | H01M 10/643 |
| | | | 429/86 |
| 2010/0173181 A1 | 7/2010 | Okada | |
| 2014/0315070 A1* | 10/2014 | Park | H01M 50/209 |
| | | | 429/151 |
| 2014/0322566 A1 | 10/2014 | Kim | |
| 2015/0140405 A1* | 5/2015 | Sakurai | H01G 2/04 |
| | | | 429/154 |
| 2016/0234963 A1* | 8/2016 | Shah | H05K 7/186 |
| 2018/0047959 A1* | 2/2018 | Kruger | H01M 50/367 |
| 2019/0006650 A1 | 1/2019 | Bryla | |

FOREIGN PATENT DOCUMENTS

| | | | | |
|---|---|---|---|---|
| CN | 103311465 A | | 9/2013 | |
| CN | 105027323 | * | 11/2015 | ............. H01M 2/12 |
| CN | 105027323 A | | 11/2015 | |
| EP | 3333934 A1 | | 6/2018 | |
| JP | 2015-195137 | * | 11/2015 | ............. H01M 2/10 |
| JP | 2015195137 A | | 11/2015 | |
| KR | 10-2011-0003912 | * | 1/2011 | ........ H01M 10/6563 |
| WO | 2019174085 A1 | | 9/2019 | |

OTHER PUBLICATIONS

Contemporary Amperex Technology Co., Limited, International Search Report and Written Opinion, PCT/CN2019/089320, Dec. 4, 2019, 12 pgs.

Final Office Action of the counterpart U.S. Appl. No. 17/976,744, mailed on Oct. 10, 2024, 14 pages.

* cited by examiner

UPPER COVER ASSEMBLY AND BATTERY PACK

CROSS-REFERENCE TO RELATED APPLICATIONS

This application is a continuation application of PCT Patent Application No. PCT/CN2019/089320, entitled "UPPER COVER ASSEMBLY AND BATTERY PACK" filed on May 30, 2019, which claims priority to Chinese Patent Application No. 201920555844.0, filed with the China National Intellectual Property Administration on Apr. 23, 2019 and entitled "UPPER COVER ASSEMBLY AND BATTERY PACK", all of which are incorporated herein by reference in their entirety.

TECHNICAL FIELD

This application relates to the technical field of energy storage devices, and in particular, to an upper cover assembly and a battery pack.

BACKGROUND

With development of the new energy industry, electric vehicles have become increasingly popular, but battery fires are also frequently happening in electric vehicles. Therefore, safety performance of electric vehicles has received great attention. However, batteries are affected by many factors, among which thermal runaway of the batteries has huge impact and is likely to cause fire and explosion. Therefore, preventing thermal runaway is particularly important.

A battery pack generally includes a lower box body, a battery accommodated in the lower box body, and an upper cover hermetically covering the lower box body. When the battery is overcharged with a current higher than a rated current or short circuit occurs, a large amount of gas is generated inside the battery and released into the lower box body. When the lower box body is full of gas and cannot discharge the gas, internal pressure is too high, so that the battery pack explodes. To prevent the battery pack from exploding due to rapid gas swelling, currently, an explosion-proof valve is provided in the upper cover, so that the gas breaks through the explosion-proof valve in the case of rapid gas swelling, to release pressure.

Currently, the traditional method for preventing a battery pack from thermal runaway is to release pressure through an explosion-proof valve. However, because the explosion-proof valve often cannot open in time, high-temperature or even sparked gas cannot be discharged from the battery pack in time, causing impact of thermal runaway of the battery pack to spread further.

In view of the above requirements and abnormal situations, a new upper cover assembly and battery pack need to be urgently designed to resolve the above problems.

SUMMARY

This application provides an upper cover assembly and a battery pack to resolve thermal runaway of a conventional battery pack caused by an explosion-proof valve failing to open in time.

This application provides an upper cover assembly, including:
an upper cover body, including a top plate and a side plate connected to an outer periphery of the top plate, where an exhaust vent is provided in the side plate; and
an exhaust unit, including a first exhaust unit and a second exhaust unit that communicate with each other, where the first exhaust unit is disposed on the top plate, the second exhaust unit is disposed on the side plate, and the first exhaust unit communicates with the exhaust vent through the second exhaust unit.

In some embodiments, along a height direction (Z), the side plate is recessed downward to form the exhaust vent.

In some embodiments, the first exhaust unit is fastened to an inner wall of the top plate; and
two second exhaust units are provided which are respectively disposed at two ends of the first exhaust unit in a width direction (Y) and fastened to an inner wall of the side plate.

In some embodiments, the first exhaust unit includes an exhaust plate, the exhaust plate is provided with a first inlet hole, and an exhaust channel is formed between the exhaust plate and the top plate; and
the first inlet hole communicates with the exhaust vent through the exhaust channel and the second exhaust unit in turn.

In some embodiments, the exhaust plate is provided with a support pin on both sides along the width direction (Y), and the support pins are fastened to the inner wall of the top plate.

In some embodiments, the first exhaust unit further includes a support plate, the support plate is fastened to the inner wall of the top plate, and the exhaust channel is formed between the exhaust plate and the support plate.

In some embodiments, the support plate is provided with a connecting plate on both sides along the width direction (Y), and the connecting plates are fastened to the inner wall of the top plate; and
the exhaust plate is provided with a support pin on both sides along the width direction (Y), and the support pins are fastened to the connecting plates.

In some embodiments, the second exhaust unit has an exhaust cavity, and two ends of the exhaust cavity communicate with the first exhaust unit and the exhaust vent, respectively.

In some embodiments, the second exhaust unit is further provided with a second inlet hole and an exhaust hole, and the first exhaust unit communicates with the exhaust vent through the second inlet hole, the exhaust cavity, and the exhaust hole in turn; and
a filter screen is provided at both the second inlet hole and the exhaust hole.

In some embodiments, the second exhaust unit is provided with a flange on both sides along the height direction (Z), and one end of the flange is fastened to the exhaust cavity, and the other end is fastened to the inner wall of the side plate.

A battery pack, including:
a lower box body;
a plurality of battery cells, accommodated in the lower box body; and
an upper cover assembly, hermetically covering the lower box body, where the upper cover assembly is the foregoing upper cover assembly.

Beneficial effects are as follows:
In this application, the first exhaust unit is provided on the top plate and the second exhaust unit is provided on the side plate, so that gas (in battery cells) can be quickly discharged from the first exhaust unit and the second exhaust unit to the exhaust vent, achieving directional guiding of the gas, and resolving thermal runaway of a conventional battery pack caused by an explosion-proof valve failing to open in time.

Figure 1:
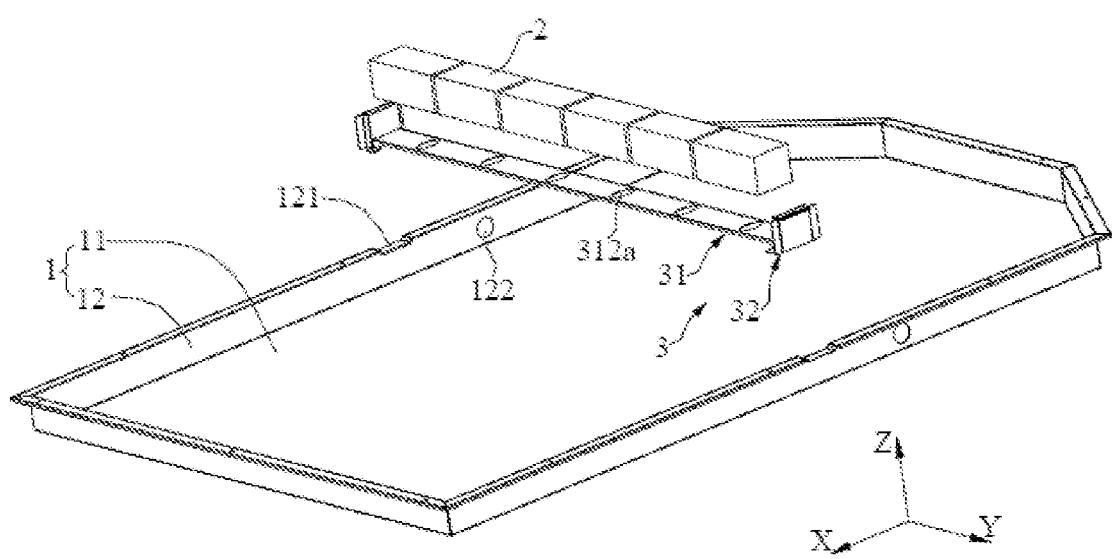
FIG. 1 is a schematic assembly diagram of a battery pack according to this application.
Figure 2:
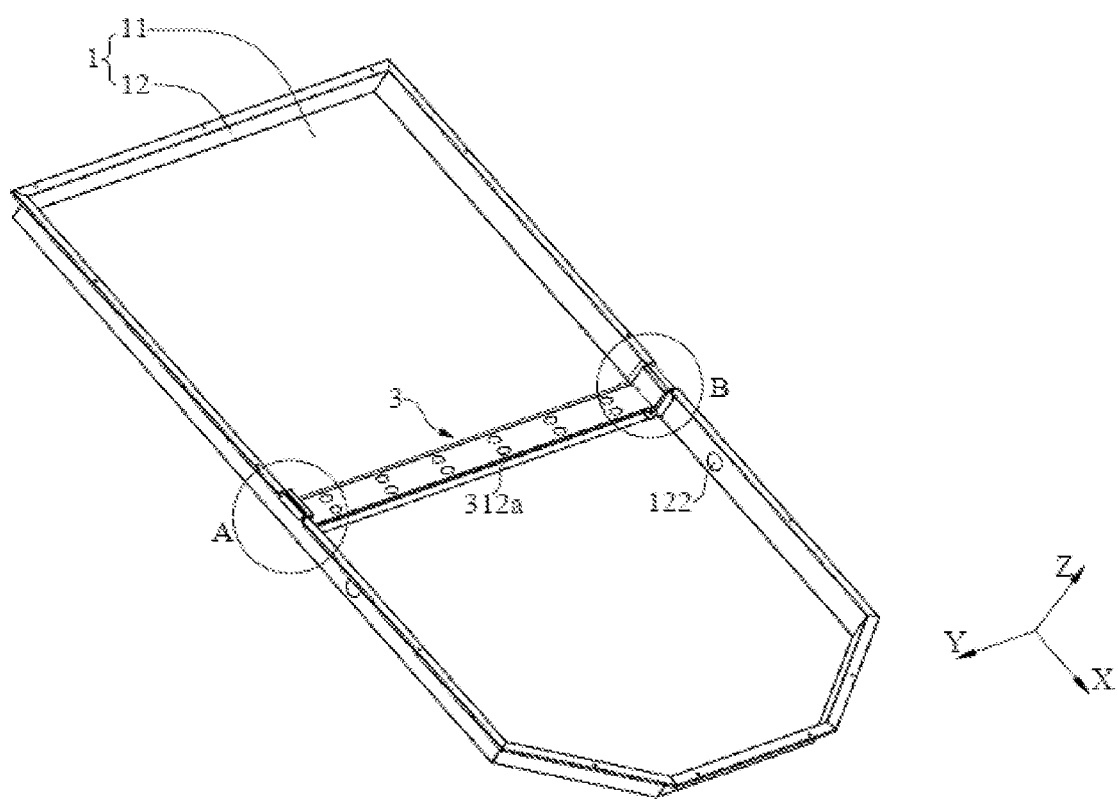
FIG. 2 is a schematic structural diagram of an upper cover assembly according to this application.

REFERENCE SIGNS 1. upper cover body;
11. top plate;
12. side plate;
121. exhaust vent;
122. explosion-proof valve hole;
2. battery cell;
3. exhaust unit;
31. first exhaust unit;
311. support plate;
311a. boss;
311b. connecting plate;
312. exhaust plate;
312a. first inlet hole;
312b. exhaust channel;
312c. support pin;
32. second exhaust unit;
321. exhaust cavity;
322. second inlet hole;
323. exhaust hole;
324. groove;
325. filter screen; and
326. flange.

The accompanying drawings herein are incorporated into this specification and form a part of this specification, illustrate the embodiments conforming to this application, and are intended to explain the principles of this application together with this specification.

DESCRIPTION OF EMBODIMENTS

In the descriptions of this application, unless otherwise specified and defined explicitly, the terms "first" and "second" are merely intended for a purpose of description, and should not be understood as an indication or implication of relative importance, and the terms "connection" and "fastening" should be understood in their general senses. For example, the "connection" may be a fixed connection, a detachable connection, an integrated connection, or an electrical connection; or may be a direct connection, or an indirect connection through an intermediate medium. A person of ordinary skill in the art can understand specific meanings of these terms in the present invention based on specific situations.

It should be understood that in this specification, a term "and/or" is only an associative relationship for describing associated objects, indicating that three relationships may exist. For example, A and/or B may indicate three cases: only A; both A and B; and only B.

This application is hereinafter further described in detail with reference to specific embodiments and accompanying drawings. The terms "front", "rear", "left", "right", "up", and "down" used herein are all directions based on the upper cover assembly and the battery pack in the drawings.

As shown in FIG. 1, a schematic assembly diagram of a battery pack according to this application is provided, and the battery pack may be used as a power source of an electric apparatus (for example, an electric vehicle). The battery pack includes a lower box body (not shown in the figure), and a plurality of battery cells 2 accommodated inside the lower box body, where the plurality of battery cells 2 are arranged in a specified direction (for example, a width direction (Y) in FIG. 1). A plurality of battery cells 2 may be arranged into a battery module (with an end plate provided at both ends along the width direction (Y)), or may just be arranged in a row (excluding end plates). A plurality of battery modules or rows of battery cells 2 are arranged in a specified direction (for example, a length direction (X) in FIG. 1) to form the battery pack. FIG. 1 shows only a fitting relationship of an upper cover assembly in the case of one row of battery cells 2.

Further, the battery pack further includes an upper cover assembly, hermetically covering the lower box body. The upper cover assembly includes an upper cover body 1 and an exhaust unit 3. The upper cover body 1 is disposed on an upper part of the lower box body accommodating the plurality of battery cells 2, and the exhaust unit 3 is disposed between the battery cells 2 and the upper cover body 1. Specifically, the upper cover body 1 includes a top plate 11 and a side plate 12 connected to an outer periphery of the top plate 11, where an exhaust vent 121 is provided in the side plate 12; and the exhaust unit 3 includes a first exhaust unit 31 and a second exhaust unit 32 that communicate with each other, where the first exhaust unit 31 is disposed on the top plate 11, the second exhaust unit 32 is disposed on the side plate 12, and the first exhaust unit 31 communicates with the exhaust vent 121 through the second exhaust unit 32.

The battery pack is provided with an explosion-proof valve (not shown in the figure), and the explosion-proof valve is installed in an explosion-proof valve hole 122 in the upper cover body 1. When high-temperature or even sparked gas is discharged from the battery cells 2 into the battery pack, the explosion-proof valve may not open in time, and consequently, and the high-temperature or even sparked gas cannot be discharged from the battery pack in time, causing impact of thermal runaway of the battery pack to spread further. In this application, the first exhaust unit 31 is provided on the top plate 11 and the second exhaust unit 32 is provided on the side plate 12, so that the high-temperature or even sparked gas (in the battery cells 2) can be quickly discharged from the first exhaust unit 31 and the second exhaust unit 32 to the exhaust vent 121, achieving directional guiding of the gas, and resolving thermal runaway of a conventional battery pack caused by an explosion-proof valve failing to open in time.

Further, along a height direction (Z), the side plate 12 is recessed downward to form the exhaust vent 121. It can be understood that the exhaust vent 121 may alternatively be provided in the side plate 12. For example, the exhaust vent 121 may be a circular exhaust vent 121, an exhaust vent 121 composed of a plurality of rectangular ports, or a weak region (that is, the exhaust vent 121 does not exist during molding and is formed only when gas breaks through the weak region). Compared with providing the exhaust vent 121 in the side plate 12, making the side plate 12 recessed downward along the height direction (Z) to form the exhaust vent 121 can better maintain structural strength of the side plate 12. In addition, this method also has a longer heat exchange path (that is, a longer gas flow distance), so that high-temperature gas can obtain a better heat exchange effect, helping reduce temperature and pressure in the battery pack.

Further, the first exhaust unit 31 is fastened to an inner wall of the top plate 11; and two second exhaust units 32 are provided which are respectively disposed at two ends of the first exhaust unit 31 in the width direction (Y) and fastened to an inner wall of the side plate 12. The two second exhaust units 32 are disposed in such a way to increase a circulation area of the high-temperature gas, thereby helping reduce the temperature and pressure in the battery pack. The first exhaust unit 31 is disposed above the battery cells 2, and the second exhaust unit 32 communicates with both the first exhaust unit 31 and the exhaust vent 121. The first exhaust unit 31 and the second exhaust unit 32 may be fastened through welding, threaded connection, or plugging. Welding is used in this application, so that airtightness of the exhaust unit 3 can be increased.

The first exhaust unit 31 and the second exhaust unit 32 are fastened to an inner wall of the upper cover body 1 (that is, the inner wall of the top plate 11 and the inner wall of the side plate 12) by welding, or may be fastened, for example, through threaded connection provided that the first exhaust unit 31 and the second exhaust unit 32 can be fastened. Fastening the first exhaust unit 31 and the second exhaust unit 32 to the inner wall of the upper cover body 1 can increase utilization of space above the battery cells. It can be understood that the drawings in this application are specific to an exhaust unit 3 disposed for one battery module or one row of battery cells 2. If the battery pack has a plurality of battery modules or rows of battery cells 2 disposed side by side, a plurality of exhaust units 3 and a plurality of exhaust vents 121 are provided on the inner wall of the upper cover body 1, so that one exhaust unit 3 corresponds to one battery module.

Figure 3:
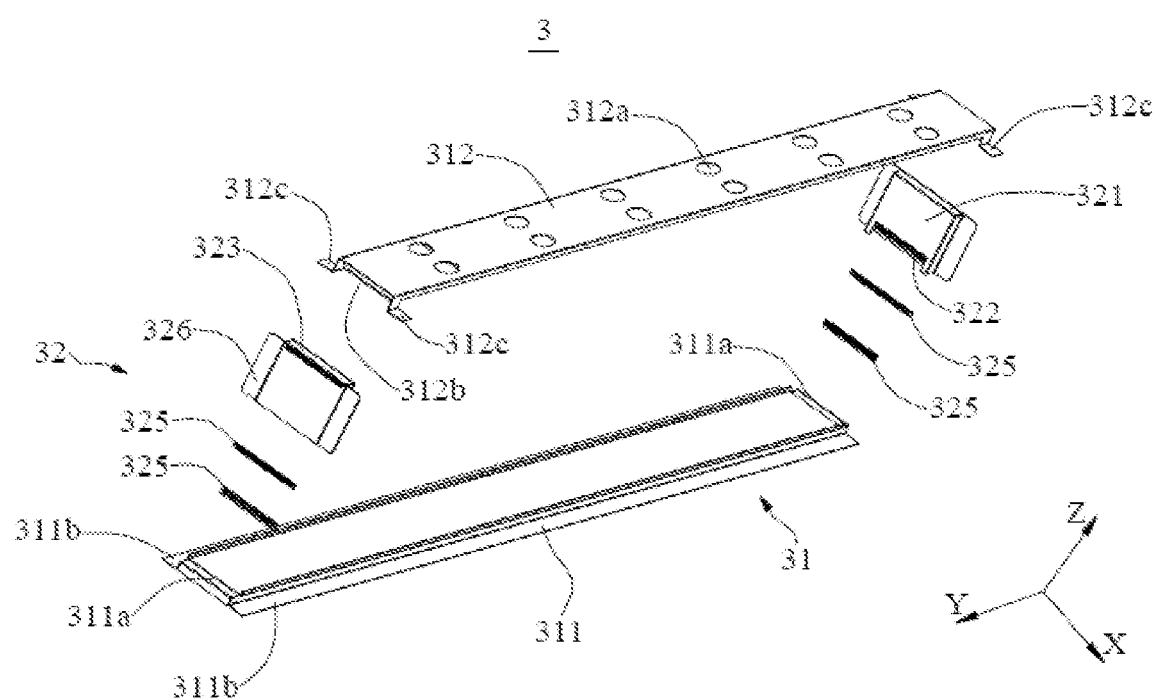
FIG. 3 is a schematic exploded view of an exhaust unit in FIG. 2.
Figure 4:
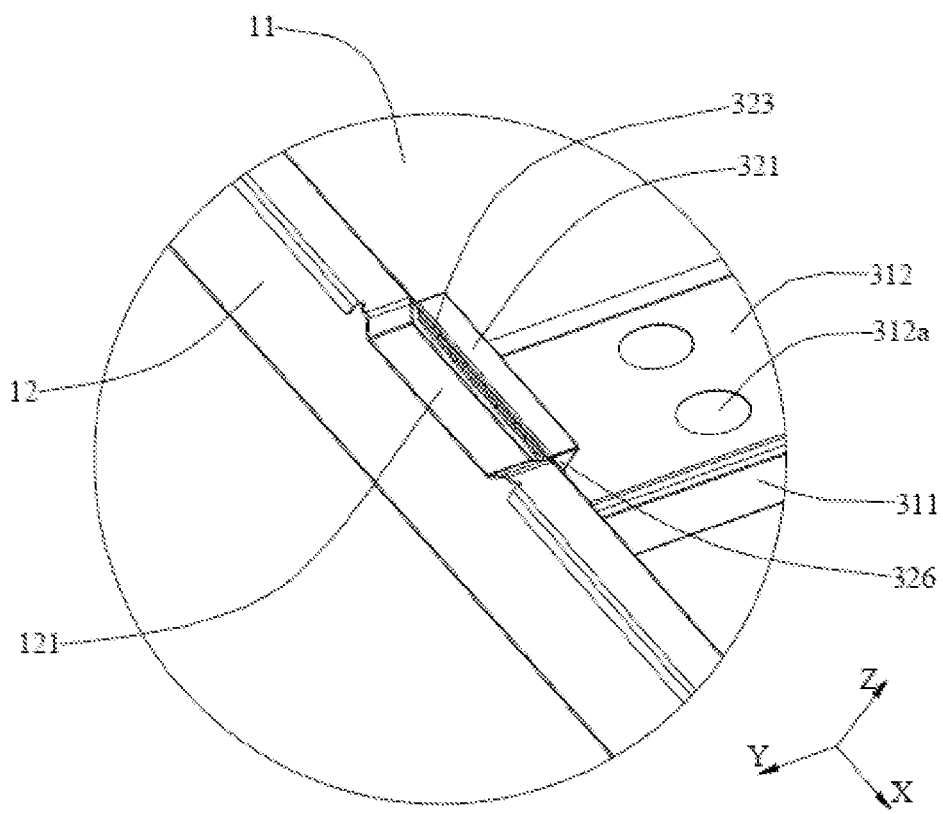
FIG. 4 is an enlarged view of position A in FIG. 2.
Figure 5:
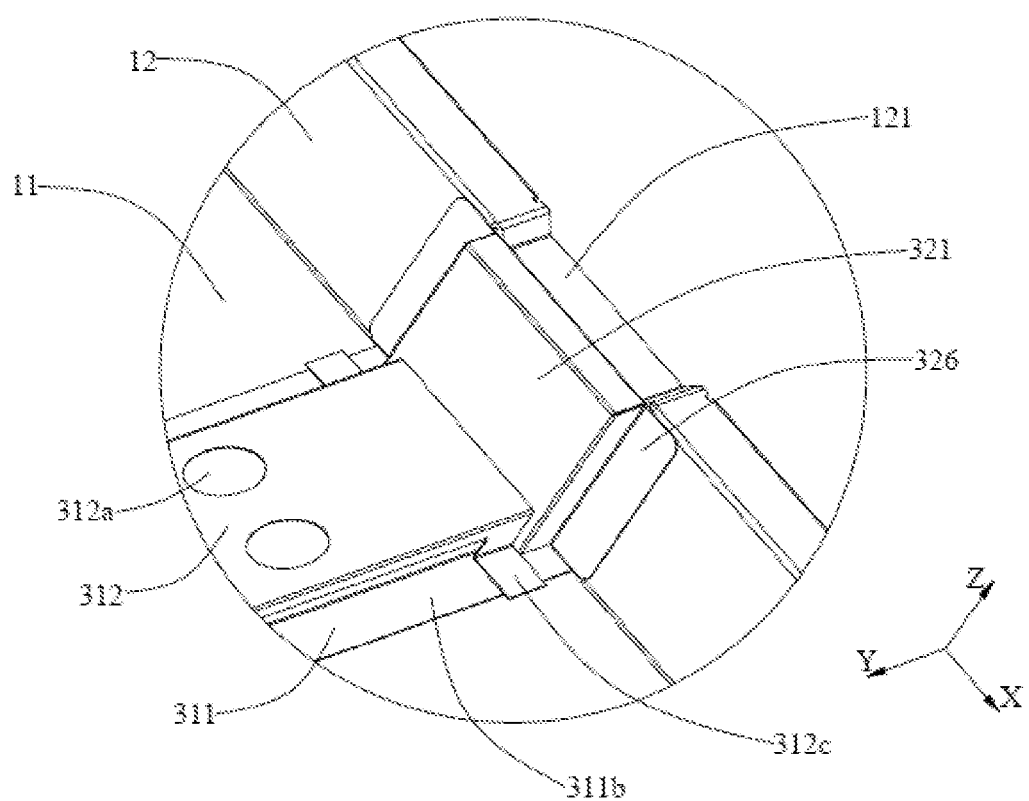
FIG. 5 is an enlarged view of position B in FIG. 2.

Further, the first exhaust unit 31 may be disposed in manners in the following two embodiments. In one of the embodiments, the first exhaust unit 31 includes at least an exhaust plate 312 (refer to FIG. 3), the exhaust plate 312 is provided with a first inlet hole 312a, and an exhaust channel 312b is formed between the exhaust plate 312 and the top plate 11; and the first inlet hole 312a communicates with the exhaust vent 121 through the exhaust channel 312b and the second exhaust unit 32 in turn. In this embodiment, the gas can be guided simply by forming the exhaust channel 312b between the exhaust plate 312 and the inner wall of the top plate 11. Each battery cell 2 corresponds to at least one first inlet hole 312a. In other words, the number of first inlet holes 312a may be set based on an actual capacity of the battery cells 2.

Specifically, the exhaust plate 312 is provided with a support pin 312c on both sides along the width direction (Y), and the support pins 312c are fastened to the inner wall of the top plate 11. An area of a welding surface between the exhaust plate 312 and the top plate 11 is increased by disposing the support pins 312c, so that the exhaust plate 312 can be firmly fastened (for example, welded) to the inner wall of the top plate 11.

In the other embodiment, the first exhaust unit 31 further includes a support plate 311, the support plate 311 is fastened to the inner wall of the top plate 11, and the exhaust channel 312b is formed between the exhaust plate 312 and the support plate 311. Compared with the foregoing embodiment, in this embodiment, the support plate 311 can better protect the top plate 11. The reason is as follows: After entering the exhaust channel 312b through the first inlet hole 312a, the gas directly rushes to the inner wall of the top plate 11, causing some impact on the top plate 11. However, with the support plate 311 disposed, the impact of gas on the inner wall of the top plate 11 can be greatly reduced, and processing difficulty of the first exhaust unit 31 can also be reduced (an area of a welding surface of the support plate 311 is much greater than an area of a welding surface of the exhaust plate 312: the former is an entire bottom surface, and the latter is only bottom surfaces of two side walls and bottom surfaces of the support pins 312c).

Specifically, the support plate 311 is provided with a connecting plate 311b on both sides along the width direction (Y), and the connecting plates 311b are fastened to the inner wall of the top plate 11; and the exhaust plate 312 is provided with a support pin 312c on both sides along the width direction (Y), and the support pins 312c are fastened to the connecting plates 311b. An area of a welding surface between the exhaust plate 312 and the connecting plate 311b is increased by disposing the support pins 312c, so that the exhaust plate 312 can be firmly fastened (for example, welded) to the support plate 311.

Figure 6:
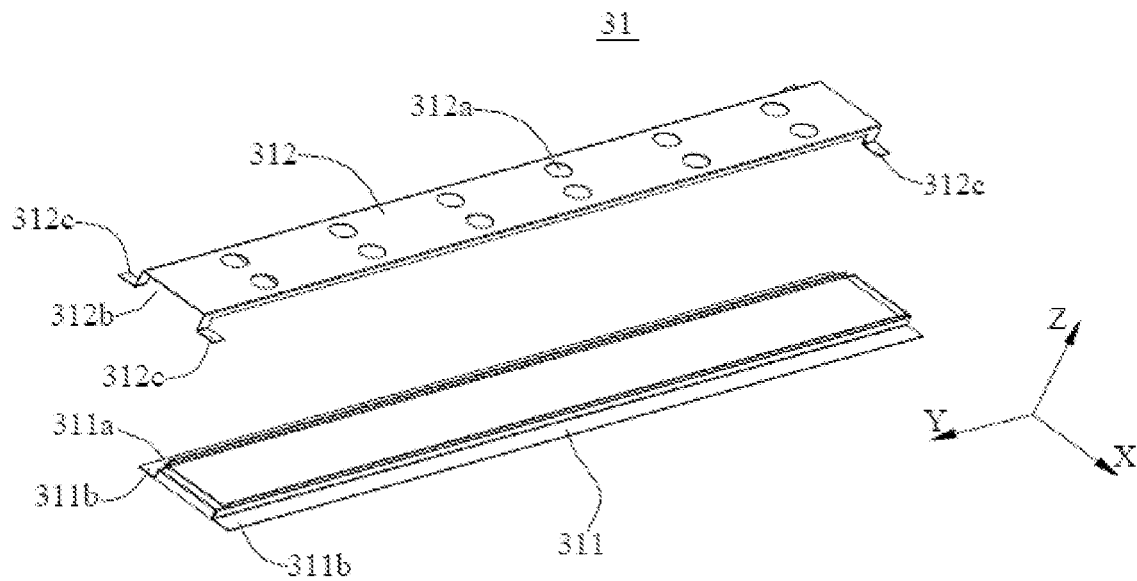
FIG. 6 is a schematic exploded view of a first exhaust unit in FIG. 3.
Figure 7:
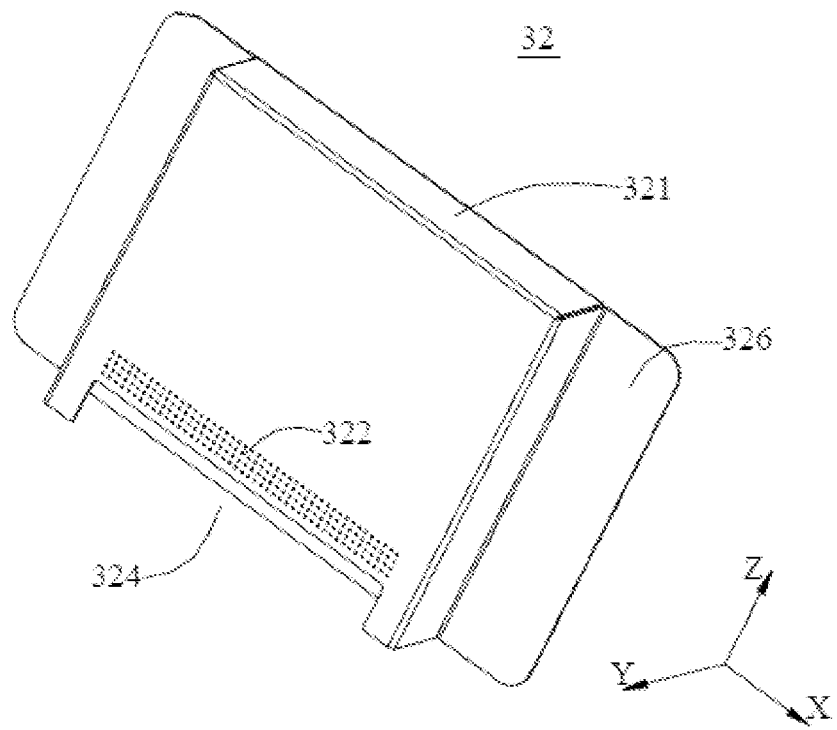
FIG. 7 is a schematic structural diagram of a second exhaust unit in FIG. 3.

Specifically, referring to FIG. 6 and FIG. 7, the support plate 311 is further provided with a boss 311a, the second exhaust unit 32 is further provided with a groove 324, and the boss 311a is configured to be inserted (e.g., inserted and then welded) into the groove 324, so that the support plate 311 can support the second exhaust unit 32 (the exhaust cavity 321 in particular).

Further, referring to FIG. 3, FIG. 4, FIG. 5 and FIG. 7, the second exhaust unit 32 has an exhaust cavity 321, and two ends of the exhaust cavity 321 respectively communicate with the first exhaust unit 31 and the exhaust vent 121. A flow direction of the gas in the exhaust cavity 321 is perpendicular to both a flow direction of gas in the first exhaust unit 31 and a flow direction of gas along the exhaust vent 121. The high-temperature gas is sprayed to the side wall of the exhaust cavity 321 through the heat exchange path change (that is, gas flows first along the width direction (Y), then along the height direction (Z), and then along the width direction (Y)). This helps the exhaust cavity 321 to take away heat of the high-temperature gas, thereby reducing the internal temperature of the battery pack.

Furthermore, the second exhaust unit 32 is further provided with a second inlet hole 322 and an exhaust hole 323, and the first exhaust unit 31 communicates with the exhaust vent 121 through the second inlet hole 322, the exhaust cavity 321, and the exhaust hole 323 in turn. In this way, the second exhaust unit 32 discharges the high-temperature gas in the first exhaust unit 31 out of the battery pack.

Specially, a filter screen 325 is provided at both the second inlet hole 322 and the exhaust hole 323. The filter screen 325 may be disposed inside and/or outside the exhaust cavity 321. The filter screen 325 is disposed inside the exhaust cavity 321, and this can increase utilization of space inside the upper cover body 1. The filter screen 325 may be fastened to the second inlet hole 322 and the exhaust hole 323 through welding or other fastening manners. The filter screen 325 of this application is fastened through spot welding, and this can simplify a processing manner and reduce assembly costs. An aperture of the filter screen 325 is smaller than an aperture of the second inlet hole 322 and an aperture of the exhaust hole 323, so that large particles or sparks carried in the high-temperature gas can be better blocked, thereby effectively reducing the gas temperature and gas contamination.

Further, the second exhaust unit 32 is provided with a flange 326 on both sides along the height direction (Z), and one end of the flange 326 is fastened to the exhaust cavity 321, and the other end is fastened to the inner wall of the side plate 12. The fastening manner may be welding or other fastening manners, e.g., spot welding. Providing a flange 326 on both sides of the second exhaust unit 32 can improve structural strength and fastening strength of the second exhaust unit 32.

It can be understood that the support plate 311 and the exhaust plate 312, the exhaust plate 312 and the second exhaust unit 32, and the second exhaust unit 32 and the support plate 311 may all be connected through welding, e.g., peripheral welding. This can effectively ensure air tightness during circulation of the high-temperature gas, thereby effectively guiding the high-temperature gas.

In conclusion, when battery thermal runaway occurs and an explosion-proof valve often cannot open in time, the high-temperature or even sparked gas flows irregularly in the battery pack. In the exhaust unit 3 of the upper cover assembly provided in this application, the high-temperature gas is first guided to the exhaust channel 312b through the first inlet hole 312a, and then flows to the second exhaust unit 32 disposed on the side plate 12. In this case, the high-temperature gas passes through the filter screen 325 after passing through the second inlet hole 322, the gas temperature drops for the first time under the action of the filter screen 325, and large particles in the gas are filtered out for the first time. Then, the gas flows inside the exhaust cavity 321 to the exhaust hole 323, and is further filtered by the filter screen 325 when passing through the exhaust hole 323, and finally discharged through the exhaust vent 121. In this way, the high-temperature gas is prevented from flowing irregularly in the battery pack, the temperature and pressure in the battery pack are reduced, and thermal runaway of the battery is avoided.

The foregoing descriptions are merely preferred embodiments of this application, but are not intended to limit this application. Persons skilled in the art understand that this application may have various modifications and variations. Any modification, equivalent replacement, and improvement made without departing from the spirit and principle of this application shall fall within the protection scope of this application.

What is claimed is:

1. An upper cover assembly, comprising:
   an upper cover body comprising a top plate extending in a length direction and a side plate extending in a height direction, wherein the side plate is connected to an outer periphery of the top plate, and two exhaust vents are respectively provided in the side plate, wherein along the height direction, each one of the two exhaust vents is in a form of a recess of the side plate; and
   an exhaust unit comprising a first exhaust unit and two second exhaust units, wherein the two second exhaust units communicate with each other and the first exhaust unit, the first exhaust unit extends in a width direction and is fastened to the top plate, the two second exhaust units are respectively fastened to two ends of the first exhaust unit in the width direction and also fastened to an inner wall of the side plate, and the first exhaust unit communicates with the two exhaust vents through the two second exhaust units, respectively,
   wherein the first exhaust unit further comprises an exhaust plate, the exhaust plate is provided with a first inlet hole through the exhaust plate, and an exhaust channel is formed by the exhaust plate and an inner wall of the top plate, the first inlet hole communicates with the two exhaust vents through the exhaust channel and the two second exhaust units,
   wherein, on each one of two opposite sides of the exhaust plate along the length direction, the exhaust plate is provided with two support pins respectively connected to each one of the two ends of the exhaust plate along the width direction, and the support pins are welded to the inner wall of the top plate.

2. The upper cover assembly according to claim 1, wherein each one of the two second exhaust units has an exhaust cavity, and two ends of the exhaust cavity respectively communicate with the first exhaust unit and one of the two exhaust vents.

3. The upper cover assembly according to claim 2, wherein each one of the two second exhaust units is further provided with a second inlet hole and an exhaust hole, and the first exhaust unit communicates with each one of the exhaust vents through the second inlet hole, the exhaust cavity, and the exhaust hole in turn; and
   a filter screen is disposed inside the exhaust cavity and welded to the second inlet hole of each one of the two second exhaust units.

4. The upper cover assembly according to claim 2, wherein each one of the second exhaust units is provided with two flanges respectively on both sides along the height direction, each one of the two flanges comprises two ends, and one of the two ends is fastened to one of the two exhaust cavities, and the other one of the two ends is fastened to the inner wall of the side plate.

5. A battery pack, comprising:
   a lower box body;
   a plurality of battery cells, accommodated in the lower box body; and
   an upper cover assembly, hermetically covering the lower box body, wherein the upper cover assembly is the upper cover assembly according to claim 1.

* * * * *